Patented Dec. 11, 1923.

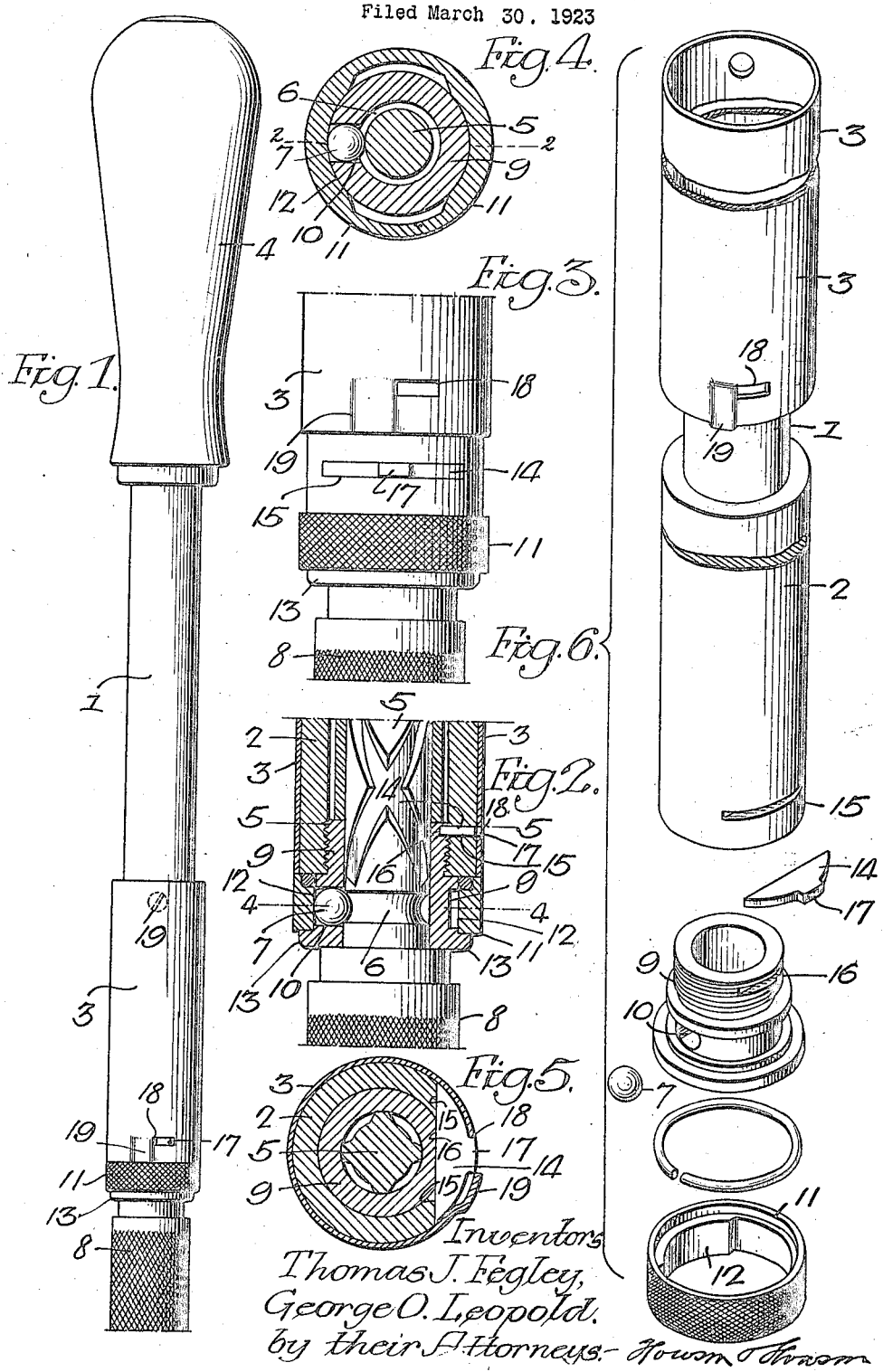

1,477,337

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

SPIRAL TOOL.

Application filed March 30, 1923. Serial No. 628,769.

*To all whom it may concern:*

Be it known that we, THOMAS J. FEGLEY and GEORGE O. LEOPOLD, citizens of the United States, residing in Philadelphia, Pennsylvania, have invented certain Improvements in Spiral Tools, of which the following is a specification.

This invention relates to certain improvements in tools of the type in which a spiral spindle reciprocates within a tubular casing, the casing having at one end a handle and at the opposite end the ratchet mechanism for controlling the direction of movement of the spindle, the spindle carrying at its opposite end a chuck to which a tool can be attached. The invention is particularly adapted for screw drivers and drills.

The general type of tool is illustrated in the patent granted to Z. T. Furbish, June 6, 1905, No. 791,766.

The object of our invention is to provide a simple and effective means for securing the locking mechanism to the casing. The function of this locking mechanism is to secure the spindle to the casing against the pressure of the spring that projects the spindle.

In the accompanying drawings:

Fig. 1 is a side view of a spiral screw driver illustrating our invention;

Fig. 2 is an enlarged sectional view on the line 2—2, Fig. 4;

Fig. 3 is an enlarged side view of a portion of the tool with the shell raised to release the securing means;

Fig. 4 is a transverse sectional view on the line 4—4, Fig. 2;

Fig. 5 is a transverse sectional view on the line 5—5, Fig. 2; and

Fig. 6 is a perspective view showing the parts detached.

Referring to the drawings, 1 is a hollow casing having a cylindrical enlargement 2 at one end enclosed within a shell 3. On the opposite end of this casing is a handle 4, secured to the casing in any suitable manner. Ratchet mechanism, which is not shown in the drawings, is enclosed by the shell and is operated in the manner clearly shown in the patent hereinbefore alluded to.

5 designates a spindle having right and left hand spiral grooves, shown clearly in Fig. 2. At the outer end of the spindle is a groove 6 to receive a locking ball 7. On the end of the spindle is a chuck 8 for the screw driver, or drill bit.

Screwed into the enlarged portion of the casing is a plug 9 through which the spindle 5 passes freely. In this plug is a transverse opening 10 for the ball 7 so that it can be projected into the groove 6 in the spindle or allowed to move back clear of the spindle. Controlling this ball is a ring 11 having a cam-shaped face 12 against which the ball rests so that, on turning the ring, the ball can be projected by the cam face or allowed to move back clear of the spindle. The ring is confined between a flange 13 on the plug 9 and the end of the enlargement 2 of the casing, as shown clearly in Fig. 2. After the plug is screwed into the enlarged portion of the spindle, it is held from turning therein by a key 14, which rests in a slot 15 in the portion 2 of the casing and in a groove 16 in the plug. The key has a projection 17 at the back. In the shell 3 is a transverse slot 18. Connected with this slot is a groove 19 formed by pressing the metal of the shell, as clearly shown in Figs. 3 and 6. This forms a bayonet joint so that, when the shell is forced over the casing into position and turned as shown in Fig. 1, the projection 17 of the key extends through the slot 18, holding the key rigidly in position. The shell is secured to the casing by a screw 19, Fig. 1.

By this construction the plug is held firmly in the end of the casing so that any movement of the ring 11, to project or retract the ball 7, will not release the plug.

When it is desired to detach the plug for any purpose, all that is necessary is to remove the screw 19, which holds the shell to the casing, after which the shell can be turned so as to bring the projection 17 of the key in alignment with the slot 19. By moving the shell longitudinally to the position shown in Fig. 3, the key can be withdrawn and the plug detached from the casing.

We claim:

1. The combination in a spiral tool, of a casing; a plug at the end of the casing; a spindle extending through the plug; means, carried by the plug, for locking the spindle to the casing; a key extending through the casing and into the plug; and a shell having a bayonet slot adapted to receive a portion of the key and lock the key in position.

2. The combination of a casing having an internal screw thread at one end; a threaded plug adapted to the threaded end of the casing; a spindle extending freely through the plug; an annular groove in the spindle; a transverse opening in the plug; a locking ball in the opening arranged to enter the groove in the spindle; a cam ring mounted on the plug for controlling the locking ball, the casing being slotted and the plug being grooved; a key extending through the slot and into the groove, said key having a projection; and a shell, mounted on the casing, having a bayonet groove therein to receive the projection of the key so as to lock the key to the casing.

3. The combination in means for securing a plug to the end of the casing of a spiral tool, of a key extending through an opening in the casing and into the plug and having a projection at the rear; a shell mounted on the casing and having a portion raised to form a groove and having a slot at one side of the raised portion to receive the projection of the key when the shell is turned; and means for locking the shell casing.

4. The combination in a spiral tool, of a casing; a plug at the end of the casing; a spirally grooved spindle extending through the plug; means, carried by the plug, for locking the spindle to the casing; a key extending through the casing and into the plug; and means for holding the key in position.

THOMAS J. FEGLEY.
GEORGE O. LEOPOLD.